United States Patent [19]

Inoue et al.

[11] Patent Number: 4,797,265

[45] Date of Patent: Jan. 10, 1989

[54] PROCESS FOR THE PRODUCTION OF HIGHLY CONCENTRATED PHOSPHORIC ACID

[75] Inventors: Tadashi Inoue; Akira Ohkoba; Kunio Sakashita; Akira Utsunomiya; Takeki Shinozaki, all of Shimonoseki; Minoru Ieda, Tokyo, all of Japan

[73] Assignee: Mitsui Toatsu Chemicals, Inc., Tokyo, Japan

[21] Appl. No.: 25,159

[22] Filed: Mar. 12, 1987

[30] Foreign Application Priority Data

Aug. 12, 1986 [JP] Japan .................................. 61-290583

[51] Int. Cl.$^4$ .......................... C01B 25/16; C01F 1/00; C01F 11/46
[52] U.S. Cl. .................................... 423/320; 423/166; 423/319; 423/555
[58] Field of Search ................... 423/320, 321 R, 166, 423/555, 319

[56] References Cited

U.S. PATENT DOCUMENTS

| | | | |
|---|---|---|---|
| 3,326,635 | 6/1967 | Davenport | 423/555 |
| 3,418,077 | 12/1968 | Robinson | 423/320 |
| 3,552,918 | 1/1971 | Fitch et al. | 423/320 |
| 3,632,307 | 1/1972 | Van Es et al. | 423/319 |
| 3,972,981 | 8/1976 | Harper et al. | 423/320 |
| 4,132,760 | 1/1979 | Ore et al. | 423/320 |
| 4,524,057 | 6/1985 | Bigot | 423/555 |
| 4,588,570 | 5/1986 | Davister et al. | 423/320 |

FOREIGN PATENT DOCUMENTS

| | | | |
|---|---|---|---|
| 59-116110 | 7/1984 | Japan | 423/319 |
| 1175577 | 12/1969 | United Kingdom | 423/319 |
| 1205122 | 9/1970 | United Kingdom | 423/319 |
| 1220963 | 1/1971 | United Kingdom | 423/320 |

Primary Examiner—Gregory A. Heller
Attorney, Agent, or Firm—Scully, Scott, Murphy and Presser

[57] ABSTRACT

A process for the production of highly concentrated phosphoric acid, comprises improvements in digesting phosphate rock with a mixed acid consisting essentially of sulfuric acid and phosphoric acid to obtain a slurry comprising phosphoric acid and hemihydrate ($CaSO_4 \cdot \frac{1}{2} H_2O$), then filtering the slurry, taking out highly concentrated phosphoric acid as product acid and subsequently hydrating the hemihydrate to obtain gypsum (dihydrate: $CaSO_4 \cdot 2H_2O$).

14 Claims, 1 Drawing Sheet

PROCESS FOR THE PRODUCTION OF HIGHLY CONCENTRATED PHOSPHORIC ACID

BACKGROUND OF THE INVENTION

The present invention relates to improvements in process for the production of highly concentrated phosphoric acid according to a so-called wet process involving digesting phosphate rock with sulfuric acid.

Generally, phosphate rock is treated with sulfuric acid producing solid calcium sulphate in phosphoric acid. Since in most instance, the calcium sulphate must be separated from phosphoric acid, it is essential to control reaction conditions so that the precipitated calcium sulphate is in a form amenble to separation. Depending on the conditions maintained during the reaction operation, the calcium sulphate may be precipitated as the dihydrate ($CaSO_4.2H_2O$), hemihydrate ($CaSO_4\frac{1}{2}H_2O$) or anhydrate ($CaSO_4$).

More particularly, the present invention is concerned with a process for the production of highly concentrated phosphoric acid and dihydrate of good quality by digesting phosphate rock with a mixed acid of sulfuric acid and phosphoric acid followed by filtration and hydrating the resulting hemihydrate, in a so-called hemihydrate-dihydrate process.

Of importance in the production of highly concentrated phosphoric acid (usually one which is 40 wt. % or more in terms of $P_2O_5$ concentration) is to maintain the water balance in a process system in an extremely advantageous condition to obtain phosphoric acid of as high a concentration as possible and to obtain dihydrate of good quality without anhydrate crystals incorporated therein, superior in filtrability and having as small a content as possible of impurities such as phosphoric acid and fluorine compounds and so on.

Particularly, in a country whose land is too narrow to permit discard of gypsum, like Japan, great importance must be attached, in considering a phosphoric acid production process, to effective utilization of gypsum (dihydrate) by-produced in a large amount in the production of phosphoric acid [gypsum is by-produced in an amount about five times as large as product phosphoric acid ($P_2O_5$)].

In other words, in order that the process can be utilized effectively industrially, it is necessary that not only phosphoric acid be obtained in high yield but also the byproduct gypsum be of good quality suitable to its direct use for cement setting retarder, gypsum wall board or other building materials.

As to the method of obtaining highly concentrated phosphoric acid according to a wet process, various researches and developments have heretofore been made in accordance with a hemihydrate-dihydrate process. Above all, those described in the following publications are well known: Japanese Patent Publication No. 10408/1970 (Nissan Kagaku process); Japanese Patent Publication No. 41155/1973 and Japanese Patent Laid Open No. 116110/1984 (Nippon Kokan process).

From an economic point of view, however, the above known processes have not always been satisfactory as industrial processes for obtaining highly concentrated phosphoric acid and gypsum of good quality, and the following problems have been involved therein.

For example, in the process described in Japanese Patent Publication No. 10408/1970, concentrated sulfuric acid is added in two stages in an phosphate rock digesting step in order to obtain a hemihydrate of good filtrability. More particularly, concentrated sulfuric acid is added dividedly so that 70–80% of calcium oxide in the phosphate rock is converted to hemihydrate in a first-stage digestion step and the remaining 20–30% converted to hemihydrate in a second-stage digestion step. Further, the digestion temperatures are each maintained at a temperature as high as about 90° C. to about 100° C., and in the second-stage digestion step the concentration of excess sulfuric acid is held in a specific range of 2% to 3%.

Thus, it is difficult and complicated to adjust the amount of sulfuric acid to be added into each digestion step. Further, according to the study of the present inventors, since the sulfuric acid added into the digestion steps is concentrated sulfuric acid, the formation of anhydrate crystals are unavoidable, which deteriorates filtrability. Besides, since the temperature of each digestion step is as high as about 90°–100° C., the apparatus concerned must be made of a material capable of withstanding such high temperature, e.g. Carpenter 20 (trademark), HV-9 (trademark), or Hastelloy C (trademark). But these materials are expensive.

On the other hand, in point of the $P_2O_5$ efficiency, the amount of phosphoric acid which is lost along with by-produced gypsum cannot be ignored. More particularly, in addition to the above-mentioned necessity of obtaining gypsum of high quality capable of being directly used for cement setting retarder, gypsum wall board or other building materials, it is very important to minimize the content of $P_2O_5$ in gypsum which is by-produced in an amount as large as 4.5 to 6 tons per ton of $P_2O_5$. However, the gypsum obtained by the process described in Japanese Patent Publication No. 10408/1970 has a $P_2O_5$ content (that is, phosphoric acid loss) as high as about 0.4%, which is disadvantageous in obtaining phosphoric acid in high yield. And its quality has not always been satisfactory in its use for cement setting retarder, gypsum wall board or other building materials.

Further, the processes described in Japanese Patent Publication No. 41155/1973 and Japanese Patent Laid Open No. 116110/1984 are superior in that cooling of the resulting hemihydrate slurry is not performed. In both the processes, however, reaction temperatures, which are in the range of 108° to 110° C., are extremely high, corresponding or close to the boiling point. Therefore, when corrosion is considered, the apparatus concerned must be made of a material capable of withstanding such high temperature, which material is more expensive than those referred to above.

Moreover, according to the processes mentioned above, since sulfuric acid is added directly into a digestion step, a partial formation of anhydrate crystals are unavoidable in the digestion step like the process described in Japanese Patent Publication No. 10408/1970. Besides, particularly in the summer season, since the temperature in hydration rises due to the increase of the outside air temperature for example, it becomes impossible to maintain the heat balance, resulting in that the sulfuric acid to be added into the digestion step must be diluted with, for example, water before its addition into the digestion step. This is inconvenient in obtaining phosphoric acid having as high a concentration as possible.

Further, in order to obtain gypsum of good quality, it has been necessary that in hydrating hemihydrate into dihydrate, a seed slurry of dihydrate crystals be prepared separately and added as seed crystals into the hydration step.

SUMMARY OF THE INVENTION

The object of the present invention resides in overcoming the above-mentioned problems of the prior art, particularly resides in providing an effective, phosphoric acid process capable of affording highly concentrated phosphoric acid in high $P_2O_5$ yield and also affording byproduct gypsum (dihydrate) of good quality.

The process of the present invention for the production of highly concentrated phosphoric acid resides in an improvement in a process comprising digesting phosphate rock with a mixed acid consisting essentially of sulfuric acid and phosphoric acid to obtain a slurry comprising phosphoric acid and hemihydrate, then filtering the slurry, taking out highly concentrated phosphoric acid as product acid and subsequently hydrating the hemihydrate to obtain gypsum, which improvement comprises mixing phosphate rock into a portion of the slurry of highly concentrated phosphoric acid and hemihydrate after completion of the digestion to obtain a premixed slurry; forming a recycle acid using substantially the bulk of washed filtrate obtained by washing hemihydrate cake from a hemihydrate filter and also using a portion of the highly concentrated phosphoric acid as product acid., adding concentrated sulfuric acid to the recycle acid to obtain a mixed acid consisting essentially of acid and phosphoric acid and having a sulfuric acid concentration in this mixed acid adjusted to less than 60 wt. %; adding this mixed acid to the above premixed slurry and allowing digestion to take place at a temperature in the range of 70° to 85° C. to obtain a slurry comprising highly concentrated phosphoric acid having a concentration of at least 40% of $P_2O_5$ by weight and including a concentration of at least 0.5% excess $H_2SO_4$ by weight and hemihydrate; recycling a portion of this slurry as a premixing slurry to a premixer, while filtering another portion of this slurry, optionally after mixing with an aqueous solution of anionic flocculating agent, by the hemihydrate filter to separate it into the highly concentrated phosphoric acid as product acid and hemihydrate, using a portion of this product acid for the formation of the recycle acid, while washing hemihydrate cake on the hemihydrate filter with mother filtrate provided from a dihydrate filter; using substantially the bulk of the resulting washing filtrate in the hemihydrate filter for the formation of the recycle acid; while slurrying the washed hemihydrate cake using washed filtrate obtained by water-washing dihydrate cake from the dihydrate filter and also using a two- to five-fold amount of the same slurry, based on the amount of dihydrate slurry obtained after the completion of hydration, (such as the amount of a dihydrate filter feed slurry); adding concentrated sulfuric acid to the resulting slurry and allowing hydration to of the hemihydrate to take place under strong agitation to obtain a dihydrate slurry; filtering this dihydrate slurry by the dihydrate filter followed by water-washing; and using the resulting mother filtrate for washing hemihydrate cake on the hemihydrate filter.

The "highly concentrated phosphoric acid" as referred to herein indicates phosphoric acid in the range of about 40% to about 55% in terms of $P_2O_5$ concentration.

The "hemihydrate filter" and "dihydrate filter" as referred to herein represent a filter for hemihydrate and a filter for dihydrate, respectively.

As to the byproduct gypsum (dihydrate) of good quality, it is a gypsum wall fully employable directly for cement setting retarder, gypsum wall board or other building materials. It is not until actual use of gypsum that whether the gypsum is proper or not is judged, but as one guideline the gypsum to be obtained in the invention is one having a total phosphoric acid content smaller than 0.3% in terms of $P_2O_5$ and an extremely small content of fluorine and other impurities and consisting of crystals superior in filtrability and washability regardless of the kind of the starting phosphate rock used.

DETAILED DESCRIPTION OF THE INVENTION

Figure 1:
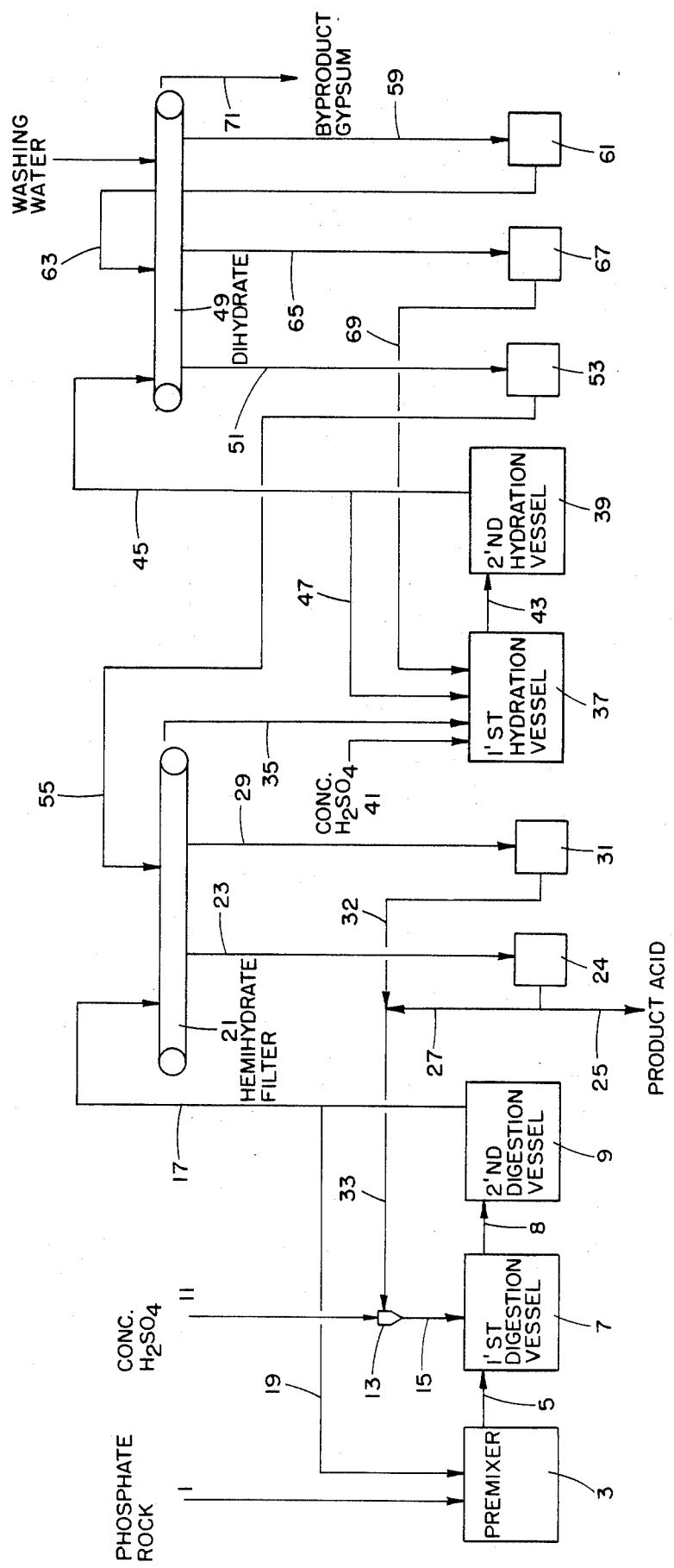

A preferred embodiment of the present invention will be described in detail hereinunder with reference to the accompanying drawing.

FIG. 1 is a flow sheet showing a preferred embodiment of the invention, in which a predetermined amount of phosphate rock 1 is fed to a premixer 3, to which is also fed simultaneously through line 19 a portion of a slurry (hereinafter referred to as the "recycle slurry") obtained after the completion of digestion in a second digestion vessel 9 and comprising highly concentrated phosphoric acid and hemihydrate. The phosphate rock 1 is fed and mixed into the recycle slurry to form a premixed slurry. The step in the premixer 3 will be hereinafter referred to as the first step.

For the digestion there are provided first and second digestion vessel 7 and 9 which are concented in series with each other. The premixed slurry formed in the first step is fed to the first digestion vessel 7 through line 5. Concentrated sulfuric acid 11 is mixed and diluted with a recycle acid into a mixed acid having a sulfuric acid concentration adjusted to less than 60% by weight (% represents weight % hereinafter) in a mixing and diluting unit 13, the recycle acid consisting of filtrate obtained by washing filtrate of a hemihydrate filter 21 and a portion of concentrated phosphoric acid from line 27, and the recycle acid being fed through line 33. The mixed phosphoric-sulfuric acid is immediately fed to the first digestion vessel 7 through line 15. From the standpoint of preventing scale formation, the mixing and diluting unit 13 is preferably of a type capable of mixing concentrated sulfuric acid and the recycle acid in a short time and supplying the mixed acid to the vessel 7 immediately thereafter. For example, a line mixer or a cyclone mixer is suitable. Hemihydrate slurry produced in the first digestion vessel 7 is fed to the second digestion vessel 9 through line 8 to complete digestion reaction. A portion of the hemihydrate slurry after substantial completion of the digestion in the vessel 9 is recycled to the first step through line 19, while another portion thereof is fed to the hemihydrate filter 21 through line 17.

The above digesting step carried out in the digestion vessels 7 and 9 will hereinafter be referred to as the second step.

The hemihydrate slurry fed through line 17 is filtered in the hemihydrate filter 21 and when using anionic flocculating agent, this slurry immediately mixed with the aqueous solution of anionic flocculating agent (although a feeding line is not shown in the flow sheet of FIG. 1), and then separated into hemihydrate and highly concentrated phosphoric acid as product acid. The product acid passes through line 23 and further through a seal tank 24 and is sent to a product acid tank (not shown) through line 25, and at this same time a portion of the product acid is fed to the mixing and diluting unit 13 through lines 27 and 33 for the formation of the recycle acid as previously noted.

The hemihydrate cake separated on the hemihydrate filter 21 is washed with mother filtrate fed from a dihydrate filter 49 through line 55, and the resulting washing filtrate is used to form the recycle acid through line 29, seal tank 31 and line 32 as noted above.

The above hemihydrate slurry filtering step in the hemihydrate filter 21 will be hereinafter referred to as the third step.

The hemihydrate filter cake obtained in the third step is conducted to a first hydration vessel 37 through line 35, in which hydration of hemihydrate is performed in the following methods. Washing filtrate obtained by water-washing filtrate of the dihydrate filter 49 is fed to the first hydration vessel 37 through line 69, to which is also fed a portion of dihydrate slurry obtained after the completion of hydration through line 47. Further fed to the first hydration vessel 37 is a suitable amount of concentrated sulfuric acid 41 for adjusting the sulfuric acid concentration in this slurry to adjust hydration and allow crystals to grow in a favorable condition, whereby the hydration is carried out in a slurried state.

The slurry formed in the first hydration vessel 37 is fed through line 43 to a second hydration vessel 39, where the hydration is substantially completed.

A portion of the resulting dihydrate slurry is recycled to the first hydration vessel 37 through line 47, while the remaining portion thereof is fed to the dihydrate filter 49 through line 45.

The above step of hydrating the hemihydrate filter cake will be hereinafter referred to as the fourth step.

The dihydrate slurry obtained in the fourth step is filtered into mother filtrate and dihydrate by the dihydrate filter 49. The filtrate passes through line 51, then through a seal tank 53 and is fed through line 55 to the hemihydrate filter 21, in which it is used for cake washing. On the other hand, the dihydrate cake separated from the mother filtrate on the dihydrate filter 49 is washed countercurrentwise with washing water 57. The resulting first washing filtrate passes through line 59, then through a seal tank 61 and line 63 and is used again for the dihydrate cake washing. The resultant second washing filtrate is sent through line 65, seal tank 67 and line 69 to the first hydration vessel 37 as noted above. The dihydrate cake after completion of the countercurrent washing is taken out as by-produced system cake from line 71.

The above dihydrate slurry filtering step will be hereinafter referred to as the fifth step.

The present invention will be described below in more detail.

As to the concentration of the concentrated sulfuric acid 11 fed to the first digestion vessel, the higher the concentration, the more preferable, in view of water balance throughout the system and also in view of production of a highly concentrated phosphoric acid. It is higher than 90%, preferably higher than 95%, and more preferably higher than 98%.

However, the present inventors have found out that if such concentrated sulfuric acid is fed directly to the first digestion vessel, there will occur a local increase of the sulfuric acid concentration in the same digestion vessel resulting in a partial formation of anhydrate ($CaSO_4$) crystals. Such this formation of anhydrate crystals hinder the digestion of phosphate rock in the premixer and the digestion vessels, thus causing a marked decrease of the digestion efficiency. Moreover, anhydrate particles are generally extremely fine crystals, which cause deterioration of filtrability and washability in the hemihydrate filter or plugging up of the filter cloth. The same problems occur also in the dihydrate filter 49 because such anhydrate crystals are still remaining in an underhydrated state also in the fourth step.

In the present invention, to avoid the occurrence of the above-mentioned problems, concentrated sulfuric acid is fed to the first digestion vessel not directly but after dilution with the recycle and into a concentration thereof less than 60%. This is one of outstanding features of the present invention. If the sulfuric acid concentration exceeds 60%, the formation of anhydrate crystals will be unavoidable. (The lower limit of the sulfuric acid concentration is 25% or so in view of the balance of the recycle acid in the digestion.)

The digestion is carried out at a temperature in the range of 70° to 85° C., preferably 75° to 80° C. A digestion temperature lower than 70° C. is inappropriate because it would cause lowering of the digestion efficiency and a partial formation of dihydrate crystals. A digestion temperature exceeding 85° C. is in a stable region of hemihydrate in appearance, but is also inappropriate because the digestion vessel temperature rises locally due to the heat of dilution and reaction heat of the sulfuric acid in the mixed acid used, thus causing a partial formation of anhydrate crystals.

Since the digestion reaction is an exothermic reaction, a cooling operation is needed to maintain the digestion vessel temperature in the above range. Therefore, a predetermined digestion temperature is maintained by subjecting hemihydrate slurry to vacuum cooling or air cooling using a cooling blower or the like (although a cooling unit is not shown in the flow sheet of FIG. 1).

The digestion vessel residence time is preferably in the range of about 1.5 to about 3.5 hours, and the hemihydrate slurry concentration in the range of about 25% to about 35% is suitable for attaining a satisfactory reaction condition. Further, an excess sulfuric acid concentration during digestion is preferably in the range of 0.5% to 2.0%.

In the present invention, unlike the prior art, the recycle acid is not recycled to the premixer but is used for the dilution of concentrated sulfuric acid, and therefore a portion of hemihydrate slurry is recycled to the premixer to adjust the slurry concentration. In order to attain a satisfactory condition of agitation in the premixer, the amount of the hemihydrate slurry recycled to the premixer is in the range of about 4 to about 14, preferably 6 to 12, more preferably 8 to 10, times as large as the amount of newly produced of hemihydrate slurry (equal to the amount of slurry taken out from the line 17).

The residence time in the premixer is preferably in the range of about 0.2 to 1.0 hour. And it is preferable in operation to maintain the premixer temperature in the range of about 70° to about 85° C.

In the present invention, as described above, the digestion temperature is as low as 70° to 85° C. and concentrated sulfuric acid is prediluted to 60% or less by the recycle acid, ensuring a gentle digesting condition in each digestion to a satisfactory extent substantially without formation of anhydrate crystals.

As to the kind of phosphate rock used in the present invention, the rock heretofore used in phosphoric acid production can be used as they are. Although it has heretofore been considered desirable to grind phosphate rock to a considerable extent, even unground rock, e.g. one passing Tyler's 8 mesh sieve, is fully employable in the process of the present invention because the reaction temperature is low and the reaction proceeds in a gentle operating condition as compared with conventional like processes.

The following description is now provided about conditions required for the hydration in the present invention.

Important conditions for the hydration are the amount of dihydrate slurry after completion of hydration in the second hydration vessel which slurry is to be recycled to the first hydration vessel, as well as the strength of agitation in the first and second hydration vessels.

The amount of the dihydrate slurry to be recycled is in the range of two to five, preferably three to four, times as large as the amount of newly produced of dihydrate slurry (equal to the amount of slurry taken out from the line 45).

Where the amount of the slurry recycled exceeds a 5-fold amount, the hydrating speed of hemihydrate crystals becomes extremely high probably because the amount of crystals acting as a kind of seed becomes too large, and the hydration is completed within 90 minutes, resulting in that the obtained dihydrate crystals are extremely fine and/or grown only in a longitudinal direction, having reduced crystal thickness and width. Anyhow, the filtering and washing performance in the dihydrate filter will be deteriorated markedly.

Conversely, where the amount of the slurry recycled is smaller than a 2-fold amount, the hydration becomes insufficient and hemihydrate crystals are still remained in the obtained dihydrate crystals probably because or a too small amount of crystals atting as seed. Thus, such amount is also inconvenient.

Under the specific amount as mentioned above of the dihydrate slurry recycled, the hydration of hemihydrate filter cake newly fed to the hydration vessel from the hemihydrate filter proceeds slowly and gentle probably because the dihydrate crystals in the recycled dihydrate slurry acts as a kind of seed crystals in an apprpriate amount. Consequently, crystals as a whole grow large in both thickness and width, with little nucleation of dihydrate crystals during the hydration. Thus, it is possible to stably obtain gypsum superior in filtrability and washability, having a low phosphoric acid content which is lower than 0.3% as $P_2O_5$, and as small a content as possible of impurities, e.g. fluorine.

The hydration time is in the range of 2 to 3.5 hours.

The agitation strength in the first and second hydration vessels must be "extremely high". "Agitating extremely strongly" as referred to herein means making agitation under the supply of excessive power about 1.3 to about 1.6 times as large as the minimum actual power required for ordinary intimate mixing and agitation. With an agitation power merely creating an ordinary intimate mixing state in each hydration vessel, it is still insufficient.

In performing a slurry reaction such as a hydration reaction of hemihydrate, if calcium phosphate particles suspend to a perfect extent to form a completely uniform solid suspension in the reaction vessel, this condition ought to be sufficient. Conditions for well-dispersed mixing and agitation to form such uniform solid suspension can be easily calculated using chemical-engineeringwise design formulae on given vessel diameter, kind of agitation blade, blade diameter, etc. Moreover, slurry concentrations in various positions of an actual vessel, for example, upper, medium and lower layers in an actual vessel, can be confirmed experimentally by monitoring such slurry concentrations continuously according to an optical method involving sampling and analysis, or visually. Making agitation under supply of an agitation power in excess of one required for attaining such uniform solid suspension may seem meaningless, merely consuming extra energy, when viewed from the conventional technical common sense.

Surprisingly, however, according to studies of the present inventors, in the hydration of hemihydrate, a mere slurry hydration under the aforementioned uniform solid suspension conditions is still insufficient and it is impossible to obtain gypsum (dihydrate) of good quality aimed at by the present invention unless the hydration is performed "under strong agitation" as referred to herein while supplying excessive agitation power which may seem meaningless from the conventional technical common sense. It is presumed that the excessive agitation energy provided has some effect on promoting the hydration reaction and the growth of dihydrate crystals. But the details thereof are unknown.

The amount of the said power required in the present invention may somewhat differ according to such factors as the type of hydration vessel and that of agitator, hydration temperature, slurry concentration, etc. But as a guideline, it is not smaller than about 0.4 kw per cubic meter of an effective hydration vessel capacity (homogeneous mixing and agitation could be attained at about 0.3 Kw/m$^3$).

Where the agitation strength is as low as that in conventional uniform solid suspension, the resulting gypsum (dihydrate) is not in a fully grown state and fine gypsum crystals are incorporated therein, so that the full water content of gypsum (dihydrate) obtained on a dihydrate filter becomes high and the fine crystals cause plugging up of the filter cloth or scaling of pipes.

In the present invention, by setting such an appropriate dihydrate slurry recycle quantity as defined above and performing "strong agitation", the hydration of hemihydrate is greatly improved and it is made possible to obtain gypsum (dihydrate) of good quality superior in filtrability and washability.

The hydration of gypsum hemihydrate in the present invention is carried out in the presence of a mixed acid consisting essentially of phosphoric acid and sulfuric acid in order to obtain gypsum (dihydrate) of good quality. As this phosphoric acid there is utilized the phosphoric acid adhered to hemihydrate filter cake, so by adding only concentrated sulfuric acid into the first hydration vessel the interior of the vessel can be held in a mixed acid atmosphere.

The mixed acid concentration ($P_2O_5 + H_2SO_4$) in hydration is in the range of about 15% to about 30%, preferably about 18% to about 28%, and the sulfuric acid concentration in the mixed acid is in the range of about 5% to about 12%, preferably about 6% to 10%. The slurry concentration in the first and second hydration vessels is in the range of about 20% to about 40%, preferably about 25% to 35%, in view of the agitation efficiency.

The hydration temperature is preferably in the range of about 50° to 70° C. Since the digestion temperature is set at a value in the range of 70° to 85° C., the hydration vessel temperature can be easily maintained at a level in the range of 50° to 70° C. which range is most suitable for the hydration, even without cooling or heating.

In the improvement for filtration of the slurry comprising highly concentrated phosphoric acid and hemihydrate, it is preferable to add into the slurry an anionic polyacrylamide-based flocculating agent comprising a copolymer of (metha)acrylamide and sodium (metha)acrylate and having a proportion of the sodium (metha)acrylate in the range of 3 to 6 mol %. The amount of the flocculating agent is preferably in the range of 0.5 to 5 ppm based on the amount of the said slurry. The addition of such flocculating agent makes more stable filtering conditions and long term filtration possible even by using a smaller sized filter.

A suitable example of such polyacrylamide-based flocculating agent is a copolymer of poly(metha)acrylamide and (metha)acrylate, or a partial hydrolyzate of poly(metha)acrylamide, exhibiting anionicity and having a proportion of acrylate in the range of 3 to 6 mol % and an intrinsic viscosity $[\eta]$ (as measured in a 1N-NaNO$_3$ solution at 30° C.) not smaller than 10 in terms of dl/g.

It is preferable that the flocculating agent be used in the form of an aqueous solution. This is because when added and mixed into the slurry of highly concentrated phosphoric acid and hemihydrate, the flocculating agent is dispersed in the slurry more easily. The concentration of the said aqueous solution is in the range of 0.05 to 0.5 wt. %, preferably 0.1 to 0.2 wt. %. The higher the concentration of the aqueous solution, the higher becomes the viscosity of the flocculating agent, resulting in that it becomes difficult to adjust the amount thereof to be added. A too low concentration thereof is not desirable, either, because it would result in a correspondingly lowered concentration of phosphoric acid.

When the flocculating agent is added and mixed into the hemihydrate slurry, the hemihydrate in the slurry flocculates to form a floc. But if the slurry containing the flocculating agent is allowed to stand under a mixing condition such as a long time agitation, the floc thus formed will be destroyed, that is, the addition of the flocculating agent is no longer effective. To avoid this inconvenience, it is preferable that the slurry after addition and mixing therein of the flocculating agent be fed to and filtered by a filter in a short time (e.g. 15 seconds to 2 minutes). It is therefore desirable that the addition and mixing of the flocculating agent into the hemihydrate slurry be carried out using, for example, a line mixer or a small-sized mixing tank equipped with an agitator.

The use of the flocculating agent is advantageous in that not only the filtrability is improved but also the hemihydrate filter cake obtained by filtration is of a low liquid content.

The filter is not specially limited. Any known vacuum filter is employable, e.g. a drum type filter, an Oliver filter, a horizontal belt filter, or a horizontal pan-like filter.

According to the highly concentrated phosphoric acid process of the present invention, as set forth above, the concentration of sulfuric acid fed to the digestion vessel is diluted to not higher than 60% using the recycle acid, and the digestion reaction proceeds slowly, gentle and mild, and is effected to a satisfactory extent even at a low digestion temperature of 70° to 85° C., so that there is obtained hemihydrate of good quality for hydration, superior in filtrability, without lowering of the digestion efficiency.

Since the digestion reaction is carried out under such mild conditions, it is possible to use a coarse phosphate rock, e.g. particles passing Tyler's 8 mesh sieve or so, although it has heretofore been considered necessary to grind phosphate rock to a considerable extent, thus resulting in that it becomes possible to greatly cut down the consumption of electric power heretofore required to use a ground phosphate rock.

Phosphoric acid obtained according to the process of the present invention has an extremely high P$_2$O$_5$ concentration which is in the range of 40% to 55%. According to conventional processes, in the case of such highly concentrated phosphoric acid exceeding 40% in terms of P$_2$O$_5$ concentration, hemihydrate crystals become very fine, thus resulting in markedly deteriorated filtrability. On the other hand, the present invention permits maintaining good crystallinity even at such high phosphoric acid concentration as mentioned above.

In the present invention, moreover, since the digestion temperature is as low as 70°–85° C. as noted above in comparison with those adopted heretofore which are in the range of 90°–110° C., it is not necessary to use such an expensive metalic material for digestion vessel e.g. Hastelloy C, Carpenter 20, or HV-9. Relatively inexpensive materials such as rubber, FRP, synthetic plastics, sus-316L and sus-317L are employable. This greatly contributes to the reduction of construction cost and repair cost and maintainance cost.

That such relatively inexpensive materials are employable means that it is not necessary to change material even when remodelling apparatus used in a dihydrate process or a dihydrate-hemihydrate process or other processes, which are conventional processes generally adopted for preparing phosphoric acid of low concentration, into apparatus for the production of the highlyconcentrated phosphoric acid in the present invention; that is, the remodelling cost is very low. This is extremely significant in this industry.

In the present invention, as describedaabove, hemihydrate of good quality superior in filtrability and not inducing anhydrate crystals are obtained in the digestion step, and in the hydration step there is performed hydration of the hemihydrate using such good quality hemihydrate as starting crystals "under strong agitation" while recycling a specific amount, corresponding to two to five times as large as the amount of the dihydrate slurry obtained, of the same slurry. Consequently, it is possible to obtain byproduct gypsum (dihydrate) of good quality which is large and uniform in particle size and which has extremely superior filtrability and washability, without adding any seed crystal. Inevitably, therefore, the gypsum (dihydrate) is of an extremely low phosphoric acid content, which is less than 0.3% in terms of P$_2$O$_5$, and its content of impurities, e.g. fluorine, is also very low. It is by no means inferior to natural gypsums and can be directly used suitably for gypsum wall board, cement setting retarder or other building materials.

Such an extremely small P$_2$O$_5$ content in the byproduct gypsum (dihydrate) indicates that highly concentrated phosphoric acid can be produced in high yield. There is attained a high P$_2$O$_5$ yield which is at least 98%, preferably not lower than 98.5%, more preferably not lower than 99%.

Working examples of the present invention as well as comparative examples are given below to further illustrate the invention.

EXAMPLE 1

An experiment for the production of highly concentrated phosphoric acid was conducted in accordance with the flow sheet of FIG. 1.

Effective capacities of the premixer, first and second digestion vessels, and first and second hydration vessels, were 3.5 m$^3$, 2.5 m$^3$, 2.5 m$^3$, 4.0 m$^3$ and 4.0 m$^3$, respectively. Agitators used in the first and second hydration vessels were of a type capable of supplying a strong agitation power, having such characteristics as shown in Table 1. As the hemihydrate filter and dihydrate filter there were used horizontal belt filters having a effective filtration area of 1 m$^2$.

TABLE 1

| Type of Blade | Fan Turbine Type |
|---|---|
| Blade dia. and Number of blades | 380 mm dia. × 6 blades × 2 stages |
| Number of revolutions | 160 rpm |
| Rated mofor output | 2.2 kw |

As the phosphate rock to be fed to the premiser there was used one obtained below passing through 8 mesh Tyler sieve after sieving of Morocco rock (moisture 0.8%, P$_2$O 31.5%, CaO 50.0%, SO$_3$ 1.8%) using the same sieve.

The mixed acid to be fed to the first digestion vessel was obtained by diluting concentrated (98%) sulfuric acid to a sulfuric acid concentration of about 50% with the recycle acid using a line mixer. The remaining recycle acid was directly fed to the first digestion vessel.

Conditions for the experiment, results of the experiment, and results of analysis of product acid and gypsum (dihydrate), are as set out in Tables 2, 3 and 4, respectively.

TABLE 2

| Premixer Conditions | Temperature 80–82° C. | Amount of hemihydrate slurry recycled: 8 times the amount of slurry produced | | | | |
|---|---|---|---|---|---|---|
| Digestion Vessel Conditions | Temperature 80–82° C. | Excess sulfuric acid concentration 1.0–1.5% | P$_2$O$_5$ concentration 51–53% | Slurry concentration 29–31% | | |
| Hydration Vessel Conditions | Temperature 62–64° C. | P$_2$O$_5$ concentration 19–21% | H$_2$SO$_4$ concentration 7–9% | Mixed acid concentration 26–28% | Slurry concentration 29–31% | Amount of dihydrate slurry recycled: 3 times the amount of slurry produced |

TABLE 3

| | Flow Rate kg/hr | Remarks |
|---|---|---|
| Phosphate Rock | 668 | |
| 98% Sulfuric Acid First Digestion Vessel | 557 | |
| First Hydration Vessel | 29 | |

TABLE 3-continued

| | Flow Rate kg/hr | Remarks |
|---|---|---|
| Washing Water | 770 | |
| Hemihydrate Filter Cake | 1,235 | |
| Recycle Acid | 1,833 | P$_2$O$_5$ 46.3%, H$_2$SO$_4$ 1.2% |
| Mother Filtrate from Dihydrate Filter | 586 | P$_2$O$_5$ 20.1%, H$_2$SO$_4$ 8.2% |
| 2nd Washing Filtrate from Dihydrate Filter | 2,236 | P$_2$O$_5$ 16.2%, H$_2$SO$_4$ 6.5% |
| Gypsum (Dihydrate) | 1,367 | |
| Product Acid | 400 | |

TABLE 4

| Product Acid | |
|---|---|
| P$_2$O$_5$ | 52.0% |
| H$_2$SO$_4$ | 1.3% |
| Gypsum (Dihydrate) | |
| Free Water | 23.4% |
| Crystal Water | 20.8% |
| T - P$_2$O$_5$ | 0.23% |
| F | 0.03% |

(Note) The analysis values are each a mean value of values obtained by analyzing sampled data every four hours.

The experiment was performed for 200 hours conitnuously without any trouble. The P$_2$O$_5$ yield during this period ws 98.8%.

Excess agitation power was supplied after confirming that in each of the first and second hydration vessels a uniform solid suspension could be fully accomplished by supplying an agitation power corresponding to an actual load of 1.1 kw (0.28 kw/m$^3$). When the state of agitation giving uniform solid suspension in the vessels was observed, an extremely strong agitation was confirmed, of course. Actual motor load was 1.6 kw (0.4 kw/m$^3$) and thus 50% excess power based on the power required for uniform suspension was supplied.

The gypsum (dihydrate) obtained was in the form of twin type crystals of uniform particle size, 200–300μ long and 50–80μ wide. Upon analysis with an X-ray diffraction device, no peaks other than those of gypsum (dihydrate) were observed. The hemihydrate was also subjected to X-ray analysis after washing with methanol, but there were observed no other peaks.

EXAMPLE 2

Using Jordan rock (obtained below 8 Tyler mesh sieve, moisture 0.5%, $P_2O_5$ 33.5%, CaO 51.0%, $SO_3$ 1.4%) and using the apparatus used in Example 1, there was conducted experiment under the same conditions as in Example 1 except that the sulfuric acid concentration in the mixed acid to be fed to the digestion vessel was adjusted to about 58%; the amount of the hemihydrate slurry recycled to the premixer was ten times the amount of slurry produced; the digestion temperature range in the first and second digestion vessels was 75°–77° C.; the $P_2O_5$ concentration was changed to 50–52%; and the amount of the slurry recycled to the first hydration vessel was changed to five times the amount of slurry produced.

Results of the experiment are as set out in Table 5, while Table 6 shows results of analysis of product acid and gypsum (dihydrate).

TABLE 5

| | Flow Rate kg/hr | Remarks |
|---|---|---|
| Phosphate Rock | 628 | |
| 98% Sulfuric Acid First Digestion Vessel | 537 | |
| First Hydration Vessel | 28 | |
| Washing Water | 772 | |
| Hemihydrate Filter Cake | 1,168 | |
| Recycle Acid | 1,780 | $P_2O_5$ 45.3%, $H_2SO_4$ 1.4% |
| Mother Filtrate from Dihydrate Filter | 583 | $P_2O_5$ 19.1%, $H_2SO_4$ 8.2% |
| 2nd Washing Filtrate from Dihydrate Filter | 2,166 | $P_2O_5$ 15.1%, $H_2SO_4$ 6.5% |
| Gypsum (Dihydrate) | 1,303 | |
| Product Acid | 400 | |

TABLE 6

| Product Acid | |
|---|---|
| $P_2O_5$ | 51.0% |
| $H_2SO_4$ | 1.4% |
| Gypsum (Dihydrate) | |
| Free Water | 24.5% |
| Crystal Water | 20.7% |
| T - $P_2O_5$ | 0.21% |
| F | 0.03% |

The experiment was conducted for 180 hours continuously without any trouble. The $P_2O_5$ yield during this period was 99.0%.

The gypsum (dihydrate) obtained was in the form of twin type crystals of uniform particle size, 250–350μ long and 60–80μ wide. Both the gypsum (dihydrate) and hemihydrate were analyzed using the same X-ray diffraction device as in Example 1. As a result, there were observed no other peaks than those of gypsum (dihydrate) and hemihydrate.

Like Example 1, the interiors of the first and second hydration vessels were held in a state of extremely strong agitation. This was attained by an excess power supply of about 55% relative to the power required for uniform solid suspension. Actual motor load for each hydration vessel was 1.7 kw (0.43 kw/m³).

EXAMPLE 3

Using Florida rock (obtained below Tyler's 8 mesh sieve, moisture 1.0%, $P_2O_5$ 33.0%, CaO 48.2%, $SO_3$ 1.1%) and using the apparatus used in Example 1, there was conducted experiment under the same conditions as in Example 1 except that the sulfuric acid concentration in the mixed acid to be fed to the digestion vessel was adjusted to 40%; the amount of the hemihydrate slurry recycled to the premixer was ten times the amount of slurry produced; the temperature range in the first and second digestion vessels was 78°–80° C.; the $P_2O_5$ concentration was 48–50%; the amount of the slurry recycled to the first hydration vessel was four times the amount of slurry produced; and the slurry concentration range was 33–35%.

Results of the experiment are as set out in Table 7, while Table 8 shows results of analysis of product acid and gypsum (dihydrate).

TABLE 7

| | Flow Rate kg/hr | Remarks |
|---|---|---|
| Phosphate Rock | 637 | |
| 98% Sulfuric Acid First Digestion Vessel | 517 | |
| First Hydration Vessel | 27 | |
| Washing Water | 781 | |
| Hemihydrate Filter Cake | 1,136 | |
| Recycle Acid | 1,703 | $P_2O_5$ 41.9%, $H_2SO_4$ 1.3% |
| Mother Filtrate from Dihydrate Filter | 610 | $P_2O_5$ 19.5%, $H_2SO_4$ 7.5% |
| 2nd Washing Filtrate from Dihydrate Filter | 1,626 | $P_2O_5$ 13.7%, $H_2SO_4$ 5.3% |
| Gypsum (Dihydrate) | 1,242 | |
| Product Acid | 422 | |

TABLE 8

| Product Acid | |
|---|---|
| $P_2O_5$ | 49.3% |
| $H_2SO_4$ | 1.1% |
| Gypsum (Dihydrate) | |
| Free Water | 24.0% |
| Crystal Water | 20.7% |
| T - $P_2O_5$ | 0.21% |
| F | 0.03% |

The experiment was conducted for 180 hours continuously without any trouble. The $P_2O_5$ yield was 99.1%. The gypsum (dihydrate) obtained was in the form of twin type crystals of uniform size, 200–300μ long and 60–80μ wide.

Both the gypsum (dihydrate) and hemihydrate were subjected to X-ray diffraction analysis in the same way as in Example 1; as a result, there were observed no other peaks than those of dihydrate and hemihydrate.

Like Example 1, both the first and second hydration vessels were held in a state of extremely strong agitation. This was attained by an excess power supply of about 64% relative to the power required for uniform solid suspension, for each hydration vessel was 1.8 kw (0.45 kw/m³).

COMPARATIVE EXAMPLE 1

Experiment was conducted under the same conditions as in Example 1 except that the digestion vessel temperature was raised to 95°–97° C.

In 80 hours after the start of the experiment the hemihydrate filter was plugged up, so the experiment was discontinued. The $P_2O_5$ yield during this period was 98%.

Table 9 shows results of analysis of product phosphoric acid and byproduct gypsum (dihydrate) in the experiment.

TABLE 9

| Product Acid | |
|---|---|
| $P_2O_5$ | 51.7% |
| $H_2SO_4$ | 1.3% |
| Gypsum (Dihydrate) | |
| Free Water | 31.7% |
| Crystal Water | 20.1% |
| T - $P_2O_5$ | 0.42% |
| F | 0.09% |

The gypsum (dihydrate) obtained was composed mainly of crystals about 150–250μ long and about wide, with many fine crystals incorporated As a result of X-ray diffraction analysis there were observed peaks of anhydrate with respect to both the dihydrate and hemihydrate. It is presumed that this anhydrate was produced in the digestion vessel.

COMPARATIVE EXAMPLE 2

Experiment was conducted under the same conditions as in Example 1 except that the concentrated (98%) sulfuric acid was fed to the first digestion vessel directly without dilution with the recycle acid. More particularly, the recycle acid was fed to the first digestion vessel directly in a position not contacting the concentrated sulfuric acid through a feed pipe separate from the concentrated sulfuric acid feed pipe.

In about 40 hours after the start of the experiment the filter cloth of the hemihydrate filter was plugged up, so the experiment was discontinued. The $P_2O_5$ yield was 97.6%.

Table 10 shows results of analysis of product acid and gypsum (dihydrate) in the experiment.

TABLE 10

| Product Acid | |
|---|---|
| $P_2O_5$ | 51.4% |
| $H_2SO_4$ | 1.5% |
| Gypsum (Dihydrate) | |
| Free Water | 33.7% |
| Crystal Water | 19.9% |
| T - $P_2O_5$ | 0.46% |
| F | 0.10% |

The gypsum (dihydrate) obtained was composed mainly of crystals about 80–150μ long and about wide, with many fine crystals incorporated therein.

As a result of X-ray diffraction analysis there were observed peaks of anhydrate with respect to both the hydrate and hemihydrate, like Comparative Example 1. It is presumed that this anhydrate was produced in the digestion vessel.

COMPARATIVE EXAMPLE 3

Experiment was conducted under the same conditions as in Example 1 except that the concentrated (98%) sulfuric acid was fed directly to the first digestion vessel; the recycle acid was recycld to the premixer; and the amount of the hemihydrate slurry recycled to the premixer was changed to an amount equal to the amount of slurry produced.

In 100 hours after the start of the experiment the filter cloth of the hemihydrate filter was plugged up, so the experiment was discontinued. The $P_2O_5$ yield was 98.2%.

Table 11 shows analysis values of product acid and gypsum (dihydrate) in the experiment.

TABLE 11

| Product Acid | |
|---|---|
| $P_2O_5$ | 51.7% |
| $H_2SO_4$ | 1.3% |
| Gypsum (Dihydrate) | |
| Free Water | 30.1% |
| Crystal Water | 20.3% |
| T - $P_2O_5$ | 0.41% |
| F | 0.05% |

The gypsum (dihydrate) obtained was composed mainly of crystals 100–200μ long and 50–60μ wide, with many fine crystals incorporated therein. As a result of X-ray diffraction analysis the existence of anhydrate was observed with respect to both the dihydrate and hemihydrate.

COMPARATIVE EXAMPLE 4

Experiment was conducted under the same conditions as in Example 1 except that the amount of the dihydrate slurry recycled in the hydration vessel was changed to an amount equal to the amount of slurry produced.

In about 25 hours after the start of the experiment an overflow pipe from the first to the second hydration vessel was plugged up, so the experiment was discontinued.

The quality of gypsum (dihydrate) was checked during the experiment to find that it was composed mainly of crystals 100–200μ long and 50–60μ wide, with many fine crystals incorporated therein.

Further, just before the discontinuance of the experiment the slurry at the outlet of the first hydration vessel was filtered and the resulting gypsum (dihydrate) cake was washed with methanol and subjected to X-ray diffraction analysis; as a result, peaks of hemihydrate were observed. This indicates that under the above conditions the hydration reaction is not effected to a satisfactory extent.

COMPARATIVE EXAMPLE 5

Experiment was conducted under the same conditions as in Example 1 except that the blade diameter of the agitators in the first and second hydration vessels was changed from 380 mm to 320 mm.

It was visually observed that the interiors of the first and second hydration vessels were in a state of uniform solid suspension. This was confirmed from the fact that there was no significant difference in slurry concentration at various point in the vessel as a result of having sampled and analyzed slurry portions under agitation in a plural number of times with respect to upper, middle and lower layers in each hydration vessel. But in about 120 hours after the start of the experiment the dihydrate filter was plugged up, so the experiment was discontinued.

During the experiment, the agitators of the first and second hydration vessels were each operated at a motor load of 1.1 kg (0.28 kw/m³).

The gypsum (dihydrate) obtained in the experiment was composed mainly of crystals 150–250μ long and 60–70μ wide, with many fine crystals incorporated therein.

As a result of X-ray diffraction analysis there were observed peaks all of dihydrate. 20 Test Example 1

Cement setting test was conducted using each of the gypsum (dihydrate) obtained in Examples 1-3 and Comparative Examples 1-5.

Using the same Portland cement clinker, each gypsum (dihydrate) was subjected to mixing and pulverization by means of a ball mill, and the resulting cement was tested in accordance with JIS R 5201.

Table 12 shows results of the text, from which it is seen that the gypsums obtained in Examples 1-3 are by no means inferior to natural gypsum and gypsum by-produced in a flue gas desulfurization (hereinafter referred to F.E. Gypsum) and are suitable for cement setting retarder. On the other hand, all the gypsum obtained in the Comparative Examples were unsuitable for cement setting retarder.

TABLE 12

| No. | Kind of Gypsum | $SO_3$ % | Cement obtained Specific surface area $cm^2/g$ | Water Content % | Setting Time Initial hr-min | Setting Time Final hr-min | Bending Strength ($kg/cm^2$) 3rd day | 7th day | 28th day | Compressive Strength ($kg/cm^2$) 3rd day | 7th day | 28th day |
|---|---|---|---|---|---|---|---|---|---|---|---|---|
| 1 | Ex. 1 | 1.65 | 3200 | 25.2 | 2-40 | 3-51 | 29.7 | 53.2 | 74.3 | 112 | 235 | 433 |
| 2 | Ex. 2 | 1.66 | 3240 | 25.0 | 2-42 | 3-49 | 30.1 | 55.4 | 75.6 | 120 | 247 | 427 |
| 3 | Ex. 3 | 1.65 | 3220 | 25.3 | 2-44 | 3-50 | 31.1 | 54.0 | 74.1 | 117 | 229 | 430 |
| 4 | Com. Ex. 1 | 1.63 | 3210 | 24.9 | 3-20 | 4-25 | 27.6 | 41.2 | 63.8 | 96 | 202 | 407 |
| 5 | Com. Ex. 2 | 1.64 | 3230 | 25.1 | 3-27 | 4-44 | 26.5 | 39.7 | 64.7 | 93 | 190 | 394 |
| 6 | Com. Ex. 3 | 1.64 | 3210 | 25.0 | 3-15 | 4-24 | 28.3 | 45.2 | 66.5 | 99 | -197 | 391 |
| 7 | Com. Ex. 4 | 1.66 | 3200 | 25.1 | 3-11 | 4-12 | 27.5 | 44.7 | 70.1 | 101 | 200 | 409 |
| 8 | Com. Ex. 5 | 1.63 | 3240 | 25.4 | 3-03 | 4-05 | 29.1 | 49.3 | 69.8 | 102 | 204 | 412 |
| 9 | Natural Gypsum | 1.65 | 3200 | 25.3 | 2-42 | 3-50 | 27.9 | 54.7 | 74.0 | 110 | 231 | 421 |
| 10 | F.D. Gypsum | 1.66 | 3230 | 25.0 | 2-45 | 3-53 | 28.1 | 51.3 | 74.1 | 108 | 210 | 425 |

TEXT EXAMPLE 2

The gypsums obtained in Examples 1-3 and Comprative Examples 1-5 were calcined each 5 kg in a gypsum test kiln and the calcined gypsums were tested according to JIS R9112. Results of the test are as shown in Table 13.

TABLE 13

| No. | Kind of Gypsum | Normal Consistency (%) | Setting Time Start (min) | Apparent Final Setting (min) | Final Setting (min) | Wet Tensile Strength ($kg/cm^2$) |
|---|---|---|---|---|---|---|
| 1 | Ex. 1 | 72 | 7 | 13 | 25 | 17.5 |
| 2 | Ex. 2 | 73 | 8 | 11 | 28 | 16.7 |
| 3 | Ex. 3 | 73 | 7 | 14 | 27 | 16.4 |
| 4 | Com. Ex. 1 | 78 | 12 | 18 | 40 | 9.6 |
| 5 | Com. Ex. 2 | 80 | 15 | 21 | 48 | 8.3 |
| 6 | Com. Ex. 3 | 77 | 14 | 19 | 43 | 10.9 |
| 7 | Com. Ex. 4 | 75 | 15 | 20 | 39 | 11.3 |
| 8 | Com. Ex. 5 | 76 | 13 | 17 | 38 | 11.1 |
| 9 | Natural Gypsum | 73 | 7 | 13 | 27 | 16.4 |
| 10 | F.D. Gypsum | 72 | 9 | 15 | 29 | 16.1 |

It is seen from Table 13 that the gypsums obtained in Examples 1-3 are superior in tensile strength, by no means inferior to natural gypsum and F.D. Gypsum and are suitable for gypsum wall board. On the other hand, all the gypsum (dihydrates) obtained in the Comparative Examples proved to be unsuitable for gypsum wall board.

EXAMPLE 4

In order to check the effect of a flocculating agent in filtering a highly concentrated phosphoric acid hemihydrate slurry, a highly concentrated phosphoric acid hemihydrate slurry (density: 1.731.76 g/cc, slurry concentration: 29–31%) prepared in the same condition as in Example 1 and a 0.1% aqueous solution of an anionic flocculating agent having a sodium acrylate content of 4.5 mol % (trade name: Accofloc A-95, a product of Mitsui Cyanamid Co., Ltd.) were fed to a line mixer at flow rates of 22–23 m$^3$/hr and 50 l/hr, respectively, and mixed thereby. The resulting mixture was fed to a horizontal belt filter having a effective filtration area of 6 m$^2$ and vacuum-filtered. The filtration, whose pressure was 260–280 Torr, proceeded favorably, but was discontinued in 20 days.

The hemihydrate obtained was measured for liquid content, which was found to be 30–32%. The concentration of the filtrate (product acid) was 51–53% in terms of $P_2O_5$ concentration, and the sludge content, 0.2–0.3%.

EXAMPLE 5

Vacuum filtration of a highly concentrated phosphoric acid—hemihydrate slurry was performed under the same conditions as in Example 4 except that a 0.12% aqueous solution of an anionic flocculating agent having a sodium acrylate content of 4.7 mol % (trade name: Accofloc A-241L, a product of Mitsui Cyanamid Co., Ltd.) was used and the feed rate thereof to the line mixer was changed to 60 l/hr. The filtration, whose pressure was 270-290 Torr, proceeded favorably, but was discontinued in 20 days.

The hemihydrate obtained was measured for liquid content, which was found to be 31-32%. The concentration of the filtrate (product acid) was 51-53% in terms of $P_2O_5$ concentration, and the sludge content, 0.2-0.3%.

EXAMPLE 6

Using the same apparatus as in Example 4, a highly concentrated phosphoric acid—hemihydrate slurry (density: 1.80-1.82 g/cc, slurry concentration: 32-33%) prepared according to a wet phosphoric acid production process and a 0.15% aqueous solution of the same flocculating agent as that used in Example 5 were fed to the line mixer at rates of 20-22 m$^3$/hr and 40 l/hr, respectively, and vacuum filtration was performed in the same way as in Example 4. The filtration, whose pressure was 240-260 Torr, proceeded favorably, but was discontinued in 20 days.

The hemihydrate obtained was measured for liquid content, which was found to be 33-35%. The concentration of the filtrate (product acid) was 51-53% in terms of $P_2O_5$ concentration, and the sludge content, 0.3-0.4%.

What is claimed is:

1. A process for the production of highly concentrated phosphoric acid, comprising digesting phosphate rock with a mixed acid consisting essentially of sulfuric acid and phosphoric acid to obtain a slurry comprising phosphoric acid and hemihydrate, calcium sulfate $CaSO_4 \cdot \frac{1}{2}H_2O$, then filtering the slurry, taking out highly concentrated phosphoric acid as product acid and subsequently hydrating the hemihydrate to obtain gypsum dihydrate, $CaSO_4 \cdot 2H_2O$, the process which comprises:

mixing phosphate rock into a portion of the slurry comprising highly concentrated phosphoric acid and hemihydrate after completion of the digestion to obtain a premixed slurry;

forming a recycle acid using substantially the bulk of washed filtrate obtained by washing hemihydrate cake from a hemihydrate filter and also using a portion of the highly concentrated phosphoric acid as product acid;

adding concentrated sulfuric acid to tee recycle acid to obtain a mixed acid consisting essentially of sulfuric acid and phosphoric acid and having a sulfuric acid concentration in this mixed acid adjusted to less than 60% by weight;

adding this mixed acid to the premixed slurry and allowing digestion to take place at a temperature in the range of 70° to 85° C. to obtain a slurry comprising highly concentrated phosphoric acid having a concentration of at least 40% $P_2O_5$ by weight and including a concentration of at least 0.5% excess $H_2SO_4$ by weight and hemihydrate;

recycling a portion of this slurry just obtained as a premixing slurry to a premixer, while filtering another portion thereof by the hemihydrate filter to separate it into the highly concentrated phosphoric acid as product acid and hemihydrate;

using a portion of the product acid just obtained for the formation of the recycle acid;

while washing the hemihydrate cake on the hemihydrate filter with mother filtrate provided from a dihydrate filter;

using substantially the bulk of the resulting washing filtrate from a hemihydrate filter for the formation of the recycle acid;

while slurrying the washed hemihydrate cake using washed filtrate obtained by water-washing dihydrate cake from dihydrate filter and also using a two- to five-fold amount of the same slurry, based on the amount of dihydrate slurry obtained after the completion of hydration;

adding concentrated sulfuric acid to the resulting slurry and allowing hydration of the hemihydrate to take place under strong agitation to obtain a dihydrate slurry;

filtering this dihydrate slurry by the dihydrate filter followed by water-washing; and using the resulting mother filtrate for washing hemihydrate cake on the hemihydrate filter.

2. A process as set forth in claim 1 for the highly concentrated phosphoric acid having a concentration of 40 to 55% by weight of $P_2O_5$ and including 0.5-2.0% by weight of excess $H_2SO_4$.

3. A process as set forth in claim 1 wherein the unground phosphate rock passing through the Tyler 8 mesh sieve is used.

4. A process as set forth in claim 1, wherein the strength of agitation in said first and second hydration vessels is about 0.4 to about 0.5 kw/m$^3$.

5. A process as set forth in claim 1, wherein the concentration of said mixed acid in hydration is in the range of about 15% to about 30% ($P_2O_5 + H_2SO_4$) by weight.

6. A process as set forth in claim 1, wherein the filtration of the slurry containing highly concentrated phosphoric acid and hemihydrate is performed after mixing with an anionic flocculating agent, said anionic flocculating agent being constituted by a copolymer consisting essentially of acrylamide or methacrylamide and sodium acrylate or sodium methacrylate in which the proportion of the sodium acrylate or sodium methacrylate is in the range of 3 to 6 mol %.

7. A process as set forth in claim 1 wherein the temperature in the premixing and the digestion is in the range of 75°-80° C.

8. A process as set forth in claim 1 wherein the amount of hemihydrate slurry recycle is about 4 to about 14 times as large as the amount of newly produced hemihydrate slurry.

9. A process as set forth in claim 1 wherein the temperature in the hydration is in the range of about 50° to 70° C.

10. A process as set forth in claim 1 wherein the byproduct gypsum contains less than 0.3 wt. % of $P_2O_5$.

11. A process as set forth in claim 5, wherein the mixed acid concentration in hydration is in the range of about 18 wt. % to 28 wt. %, and the sulfuric acid concentration in the mixed acid is in the range of about 5 wt. % to 12 wt. %.

12. A process as set forth in claim 6, wherein the flocculating agent is used in the form of an aqueous solution.

13. A process as set forth in claim 12, wherein the concentration of the said aqueous solution is in the range of 0.05 wt. % to 5 wt. %.

14. A process as set forth in claim 6, 12 or 13, wherein the amount of the flocculating agent is in the range of 0.5 to 5 ppm based on the amount of the filtering hemihydrate slurry.

* * * * *